(12) United States Patent
Ainedter et al.

(10) Patent No.: US 6,868,847 B2
(45) Date of Patent: Mar. 22, 2005

(54) METHOD AND APPARATUS FOR PRODUCING WALL PANELS

(76) Inventors: Dieter Ainedter, Kreuzbergpromenade 49, A-5026, Salzburg (AT); Christoph Ainedter, Kreuzbergpromenade 49, A-5026, Salzburg (AT)

( * ) Notice: Subject to any disclaimer, the term of this patent is extended or adjusted under 35 U.S.C. 154(b) by 0 days.

(21) Appl. No.: 10/173,127

(22) Filed: Jun. 17, 2002

(65) Prior Publication Data

US 2003/0230297 A1 Dec. 18, 2003

(51) Int. Cl.[7] .................................................. B28D 1/02
(52) U.S. Cl. ........................................ 125/12; 52/749.14
(58) Field of Search ..................... 125/12, 35; 33/404, 33/410, 527; 52/749.14

(56) References Cited

U.S. PATENT DOCUMENTS 3,933,570 A * 1/1976 Wright et al. ............... 156/558
4,060,955 A * 12/1977 Lachnit ..................... 52/749.14
4,067,766 A * 1/1978 Larger ......................... 156/297
4,094,118 A * 6/1978 Lingl, Sr. ................. 52/747.12
5,016,419 A * 5/1991 Boot et al. ............... 52/749.14
6,370,837 B1 * 4/2002 McMahon et al. ....... 52/749.14

FOREIGN PATENT DOCUMENTS

| DE | 44 33 156 | 3/1996 | |
|---|---|---|---|
| EP | 0 495 525 | 7/1992 | |
| EP | 495525 A2 * | 7/1992 | ............. E04C/2/04 |
| EP | 1111148 A1 * | 6/2001 | ............. E04C/2/04 |

* cited by examiner

*Primary Examiner*—David B. Thomas
(74) *Attorney, Agent, or Firm*—Flynn, Thiel, Boutell & Tanis, P.C.

(57) ABSTRACT

In a method for producing wall panels, bricks (9) are partly cut at a cutting station, conveyed to a line-up path (5) and then masoned into wall panels. Bricks (9) to be cut are gripped by a transport and holding device (12; 12a; 34; 49; 66), transported to the cutting station (19, 20; 24a; 50) and cut at the cutting station (19, 20; 24a; 50) in the required cutting planes in the state as clamped in the transport and holding device.

26 Claims, 10 Drawing Sheets

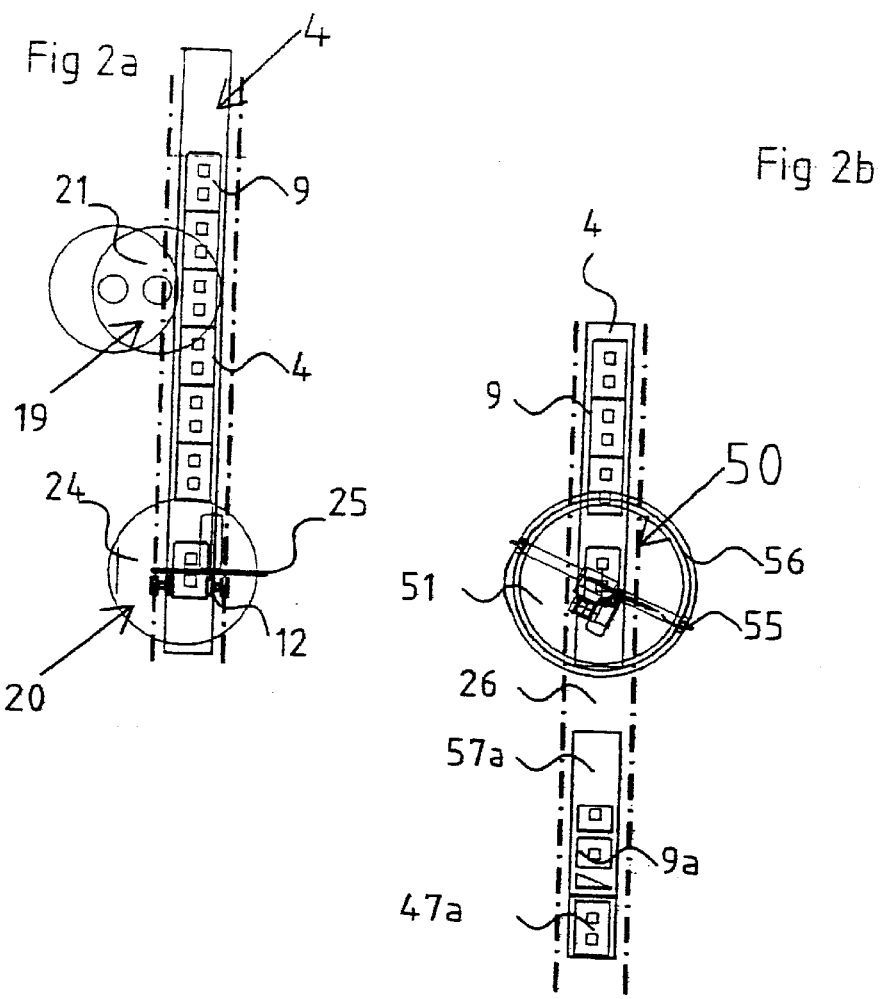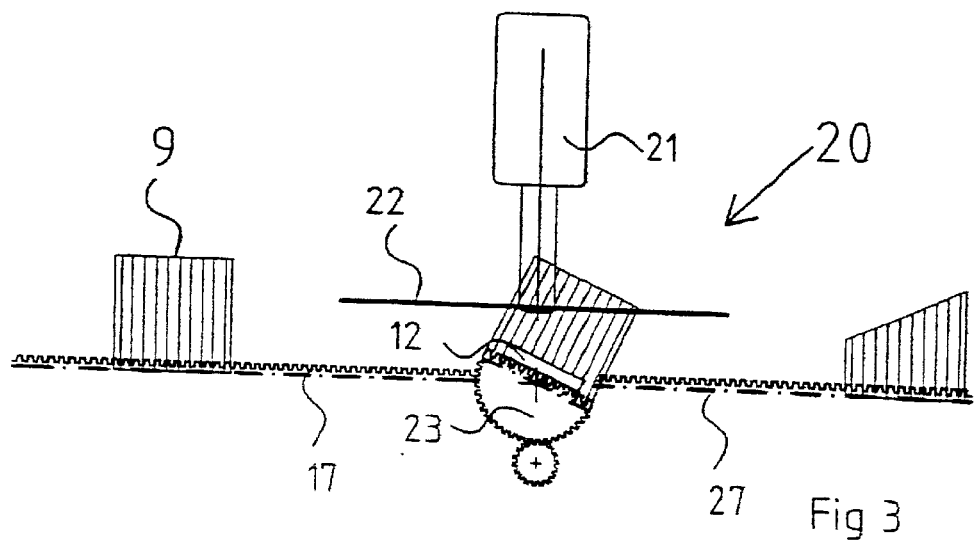

METHOD AND APPARATUS FOR PRODUCING WALL PANELS

Figure 1:
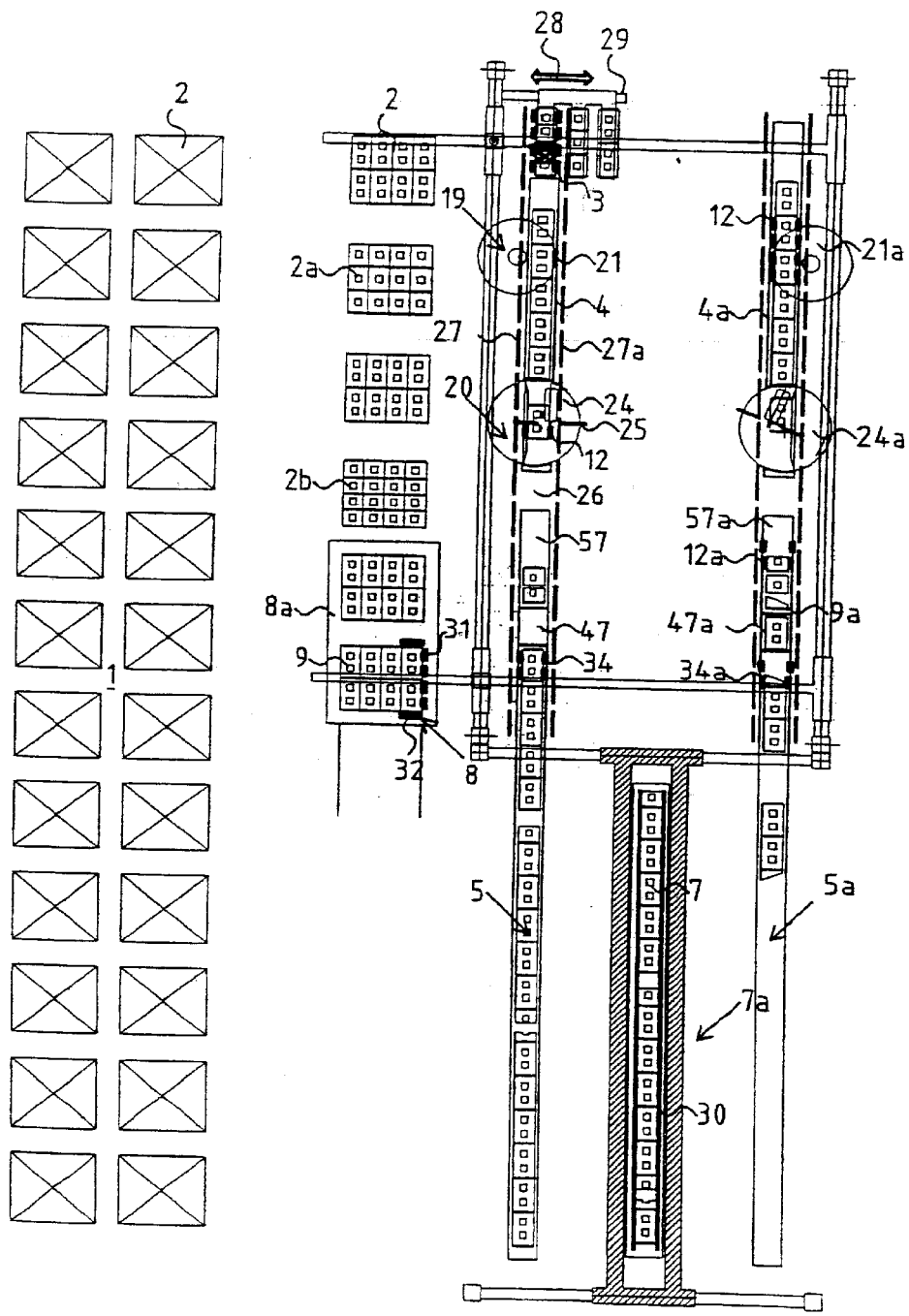

This invention relates to a method for producing wall panels according to the generic part of claim 1 and to an apparatus for carrying out said method.

Wall panels are masoned from prefabricated bricks by the factory in accordance with the building plans of the building to be erected, transported to the particular building site and joined together there to form the building to be erected.

DE 44 33 156 A1 discloses a method for producing wall panels wherein the bricks are set right next together in a layer of the wall panels and aligned flush on one side of the wall panel. After production of a wall panel, the latter is cut to basic size on the side out of alignment. This involves a relatively high share of waste. In the case of windows, bays, roof slopes and the like, the subsequent cutting and disposal of the chips must furthermore be performed manually.

EP 0 459 525 B1 discloses a method for producing wall panels wherein each brick is deposited on a pallet alone in the way corresponding to its later assembly, the pallets being set down on a continuous conveying apparatus in the way corresponding to the assembly order of the bricks, and transported by said apparatus to a wall portal where they are gripped by a computer-operated transfer gripper traveling in the longitudinal direction of the wall, and brought into a precalculated position.

At most two contiguous bricks are gripped and walled up here. The bricks to be cut are guided through a stone saw having two circular saw blades disposed at an angle to each other. The unit with the two saw blades can be adjusted in the vertical direction so that e.g. corner cuts can be performed in one run. The known method is relatively slow because only one or at most two bricks are walled up simultaneously. Also, elaborate handling of the bricks is required to bring them into the right cutting position.

It is known from BETONWERK+FERTIGTEIL-TECHNIK BFT, no. 5/1999, pp. 56–62, to supply whole and cut bricks on a line-up path in a brick row in the necessary order for masoning the wall to a transfer robot that walls up the bricks on the line-up path one after the other onto the wall panel after the uppermost brick row of the wall panel has been coated with mortar.

For cutting the cut bricks one or two stone saws with a robot are provided that is able to rotate a brick about two axes and thus supply it to the saw in the required orientation. First, the bricks are depiled from the brick pile with an unloading robot, then deposited on a conveying path and singled. The whole bricks are supplied directly to the transfer robot over a long conveying path. Bricks to be cut are supplied to a separate conveying path via a diverter and crosscut to size in a separate saw (square cut). A sawing robot removes the square cut bricks individually from the stone saw and deposits them on a buffer belt.

In the case of bricks with a plurality of cut edges or out-of-square cuts, the bricks to be cut are supplied to a second stone saw in the corresponding cutting position by the sawing robot, which has altogether five axes, and then clamped against the cutting table by a clamping jaw acting from above, and cut, and, if required, gripped again, rotated and cut in a second cutting plane. After sawing, the tension is relieved and the cut brick is gripped by a gripper that transports it into a bank from where it is added to the line-up path at the relevant place in the brick row by the gripping apparatus.

Cutting and handling the bricks thus takes a lot of time. In the case of bricks with a plurality of cut edges, the required time is especially great. The corresponding brick must be released after each cut, moved out of the saw and gripped by the robot again and moved back into the saw rechucked.

It is to be considered here that in particular complex wall panels as are required for facades with windows, bays and roof slopes require a large number of individually cut bricks, which can amount to up to 70% of all bricks of the wall panel.

A further disadvantage is that in order to permit the bricks to be gripped, parallel surfaces must be left on the brick to be cut. Thus, no cuts over the total diagonal of the brick as required for roof slopes can be performed for example. Such cuts can only be produced manually and separately by methods with rechucking of the bricks.

The problem of the invention is to substantially increase the productive capacity of an automatic plant for producing even complex wall panels.

This is obtained according to the invention with the method stated in claim 1. Claims 2 to 11 render advantageous embodiments of the inventive method. Claim 12 states a preferred apparatus for carrying out the inventive method, which is developed by the features of the following subclaims.

According to the invention, the bricks to be cut are gripped by a transport and holding device and transported to the cutting station with the transport and holding device and cut in the required cutting planes preferably in the same clamping, i.e. without rechucking. This guarantees efficient and simple cutting of the bricks even in case of complicated cuts. If regripping is necessary, this is done without any delay in the production process in flying change, from one pair of clamps to another.

Bricks can have considerable tolerances due to shrinkage during drying and the like. The delivered bricks are therefore preferably measured according to the invention, whereupon an average brick size is determined on the basis of the measured brick sizes, the cut is performed on the basis of the average brick size and the bricks are lined up in the line-up path by pulling apart the bricks while correcting the difference of average and measured brick sizes. The cut on the basis of the average brick size effects a rough compensation of the brick tolerances. Fine compensation is effected by pulling apart the bricks to be lined up. The pulling apart only corrects the deviation of the actually measured sizes from the averaged value on the basis of which the cut was effected.

In a preferred development of the invention, the bricks are depiled from brick piles by a depiling gripper, conveyed on and measured, the measurement preferably being performed during depiling and/or conveyance to the line-up path. In particular, said measurement determines the length of the bricks. A whole brick row of the brick pile is expediently gripped in the longitudinal direction so that the length of the total brick row can be measured. The size of the individual bricks can then be determined from the number of gripped bricks for determining the average brick size.

The bricks to be cut are preferably cut working up a stock and temporarily stored in a buffer. For lining up the wall panel rows, the no-cut whole bricks are then brought together with the buffered cut bricks. The uncut bricks are expediently conveyed from the brick pile directly to the line-up path, while the bricks to be cut are supplied to the corresponding cutting station. Intermediate storage of the cut bricks in a buffer permits the cutting of the bricks to be effected quasi continuously in the cutting station. Time-consuming cutting can be effected with a time shift in a phase when no cut brick is required for the wall panel row to be processed at the moment. The buffer can be formed by a conveyer belt.

Fine correction of the wall panel row to be lined up by pulling apart individual bricks is preferably performed during transport of the bricks to the line-up path, in particular while they are gripped by a depiling gripper that depiles the bricks delivered in the form of brick piles.

For the cutting of the bricks to be performed efficiently, bricks are gripped before cutting by a transport and holding device and cut in optionally a plurality of required cutting planes in the same clamping, preferably in the state as clamped in the transport and holding device. The cutting process is thus effected without regripping, even if a plurality of cutting planes are required. Cutting of the bricks is thus preferably effected in the cutting station directly on the conveying path. The bricks to be cut are supplied preferably directly from the brick piles to the conveying path according to the invention. Likewise, the no-cut bricks are supplied preferably directly from the brick piles to the line-up path.

Further, only the cut or cutting bricks are preferably moved by the transport and holding device according to the invention, while the no-cut or whole bricks are placed directly on the line-up path by the depiling gripper. In addition, the bricks to be cut are preferably moved through below the saw with the transport and holding device, i.e. gripped by the transport and holding device from below.

The bricks to be cut are preferably cut in the required cutting planes in the state as clamped in the transport and holding device, i.e. the clamping jaws of the transport and holding device are formed for clamping the bricks to be cut at the cutting station. However, the brick to be cut can also be held by another device during cutting, for example by a die pressing against the brick from above during cutting. Said die can be formed for example by the saw cover in the vertically cutting cutoff saw.

According to the invention, the bricks to be cut can be cut in a single cutting station having a universal saw. To permit cuts in different planes, the saw is preferably swiveled about the required axes, that is, the saw is rotated relative to the brick. The latter can be held in a single position. Rotation of the brick is avoided.

According to an alternative embodiment of the invention, each brick to be cut is moved successively into different cutting stations where different cuts are performed. In the different cutting stations, different bricks can be cut simultaneously.

In a development of the invention, the height and/or top profile of the bricks to be cut are cut in a first cutting station, and the length and/or side contour in a second cutting station. In the first cutting station, bevel cuts as required in bricks for roof slopes, or L cuts for window corners and the like, can be performed. In particular, horizontal cuts can be done in the first cutting station in order to produce a desired height of the corresponding wall row. In the second cutting station, the end cuts required in particular for edge bricks of a wall panel row are then executed.

For example, bricks can be cut square to the desired length or cut off at an angle with a desired miter square for out-of-square wall ends. L cuts can be produced as follows. The first cut is produced in a first horizontal saw, the second cut rotated by 90° is produced in the second cutting station.

The bricks of a wall panel row can then be pushed together before the last cutting station and the first and/or last brick of the row is crosscut in dependence on the length of the pushed-together brick row. Tolerances of the processed bricks are thus irrelevant. The actual size of the brick row is decisive for the crosscut, and bricks are cut to the actually desired length.

According to a further embodiment of the invention, however, preferably only the bricks to be cut are guided through the cutting station(s), while uncut bricks are supplied to the conveying path downstream of the cutting station(s), being supplied preferably directly to the line-up path. This obtains maximum utilization of the cutting station (s) and permits a cut brick buffer to be inserted after the saw. Alternatively, the uncut bricks can also be added to the conveying path of bricks to be cut before the last cutting station so that only the preceding cutting station(s) are avoided. This permits the last cut of the bricks to be performed in dependence on the actual size of the complete brick row.

The actual length of the individual bricks can be detected for example upon gripping of the bricks from the brick piles and taken into account by the control unit for the cutting station. The drive of the cutting station is effected in the above-described fashion on the basis of the averaged length of the bricks of a batch, plus a tolerance dimension of a few millimeters for outliers.

For walling up the lined up brick rows, the lined up bricks are gripped by the transfer robot and transferred to the descending wall plate of the bricklaying station.

Mortar or binder for walling up the individual brick rows can be applied in different ways. For example, mortar can be applied by a mortar slide to the wall being formed before the next brick row is mounted. If adhesive mortar is to be applied, then the gripped brick row is preferably moved over a cylinder with adhesive mortar. This has the advantage that the required time for mortar application cannot become a bottleneck. Especially fast mortar application can be obtained in particular if the brick row is moved over the cylinder at right angles to the wall direction.

While thin-bed mortar was hitherto applied by moving a slide over the wall in the longitudinal direction, so that the mortar slide was a cycle-determining part since mortar can only be pressed out of the mortar nozzle at a limited speed, the cylinder for applying thin-bed mortar that is preferably transverse according to the invention obtains an essential improvement.

To adapt to the cut bricks required at the moment, and reduce waste, bricks of different length and/or height can also be supplied to the cutting station.

In contrast to conventional methods and plants for producing wall panels, the bricks, according to a further aspect of the present invention, are fed to the conveying path or supplied to the line-up path directly from brick piles by a depiling gripper provided for depiling the piles.

In conventional plants it was a disadvantage that bricks were not placed on the conveying path or line-up belt directly from the brick pile but first fed to a chain belt and transported from there into the gripping area of the different robots for serving the saw and transferring the bricks. The conveying paths had several lanes so that diverters were disposed for supplying the bricks to the individual lanes.

The diverters and the brick supply were a bottleneck in terms of time. Besides the additional mechanical engineering effort for the supply lanes, it proved to be an additional disadvantage that a change of bricks required the supply lanes to be emptied first, which was usually only possible by manual clearing. This can be avoided by depiling directly from the brick pile.

The abovementioned depiling gripper preferably has integrated therein the aforesaid measuring device and the positioning apparatus for pulling apart the bricks. The depiling gripper thus realizes three functions simultaneously: firstly, depiling the delivered brick piles, secondly, measuring the bricks to be walled up and, thirdly, fine adjustment or fine compensation of the dimensional tolerances of the bricks. The depiling gripper expediently has longitudinal grippers for gripping a brick row of a brick pile in the longitudinal direction and transverse grippers for individually gripping each single brick of a brick row. The transverse grippers are preferably formed to travel in the longitudinal direction for pulling apart the bricks of a gripped row.

Accordingly, the brick row can first be gripped by the longitudinal grippers with the transverse grippers swiveled away. Regripping is effected in the air. The transverse grippers grab while the longitudinal grippers are moved away. In this gripping position the transverse grippers can also be made to travel to align the bricks accordingly.

The measuring device expediently detects the distance of the longitudinal grippers which corresponds to the length of the gripped brick row while the latter is gripped by the depiling gripper. The distance of the longitudinal grippers thus preferably corresponds to the length of one pile row.

The depiling gripper can preferably travel from the delivery station where the brick piles are set down to the conveying path with the at least one cutting station, and to the line-up path. This permits the depiling gripper to serve both the cutting station and the line-up path. Optionally, a plurality of depiling grippers can also be provided, for example one for serving the conveying path or paths for cutting, and a second one that can travel to the line-up path.

A measuring device for measuring the bricks and a control device are thus provided according to the invention, the control device being formed so as to determine an average brick size from the measured brick sizes and drive the cutting station so that it cuts the bricks on the basis of the average brick size. A positioning apparatus drivable by the control device can be provided for pulling apart the bricks to be lined up in accordance with the difference of the detected and average brick sizes. A depiling gripper having the measuring device and/or positioning device integrated therein is provided for transporting the bricks from the brick piles to the conveying path or line-up path. The depiling gripper has longitudinal grippers for gripping a brick row in the longitudinal direction and transverse grippers for gripping a single brick of a brick row, the transverse grippers being formed to be movable in the longitudinal direction. The measuring device detects the distance between the longitudinal grippers.

According to an advantageous embodiment of the invention, a single cutting station with a universal saw is provided, said saw or rather its saw blade swiveling about a plurality of axes. The swivel is such that bricks to be cut can be cut in the necessary different cutting planes. The arrangement of a single cutting station with a universal saw obtains a short and compact structure of the brick plant.

According to an alternative embodiment of the invention, a plurality of cutting stations can be provided in tandem along a conveying path, the bricks being cuttable in said stations successively in a plurality of cutting planes. Each cutting station is formed for a different cutting plane. Cutting stations are interconnected by the conveying apparatus and effect cutting in a plurality of planes in the run of bricks. Tandem arrangement of a plurality of cutting stations allows all required forms of cut to be produced without use of an expensive cycle-inhibiting robot for positioning bricks.

The transport and holding device that grips the brick to be cut, transports it to the cutting station or stations for it to be cut at the cutting station or stations in the state as clamped in the transport and holding device can be formed in different ways.

It can thus be formed by a conveying gripper adapted to travel along the conveying path and holding the brick with its clamping jaw pair.

Instead, two conveying grippers that can overtake each other can also be adapted to travel along the conveying path. While one conveying gripper is holding the brick in the cutting station with its clamping jaws, the second conveying gripper grips the brick with its clamping jaws. The first conveying gripper can now release the brick and return to get the next brick to be cut. The conveying gripper or grippers can have a length corresponding to the length of one pile row.

According to another embodiment of the invention, the transport and holding device provided is at least one elbow arm robot that grips bricks to be cut and, without regripping, supplies them to the cutting station at cutting speed and, if required, cuts them in a plurality of cutting planes in the same clamping. The saw can optionally be formed to be stationary. In this case the brick gripped by the "hand" of the elbow arm robot is repositioned and rotated in order to obtain different cutting planes. In this variant no regripping is necessary for performing cuts in a plurality of planes either. However, a universal saw with a plurality of cutting planes can also be used.

For bricks to be given the desired diverse forms in the cutting station or stations, different cutting planes can be adjusted independently of each other. Cutting control can be optimally adapted to the desired profile and virtually any desired geometries obtained.

Preferably, at least one of the cutting stations has a swiveling apparatus associated therewith for swiveling the cutting planes; in particular the transport and holding device including the clamping jaws can be formed to swivel or tilt in the area of the cutting station.

For this purpose the conveying apparatus is interrupted in the area of the cutting station and a tilting table provided for tilting the bricks in the cutting station, the clamping jaws being movable over the tilting table and tiltable together therewith. The tilting table is preferably tiltable by at least 90° so that cuts in planes at right angles to each other can be provided, as are necessary with L cuts for example.

Greater freedom in cutting control can be obtained if the saw blade or other cutting means of each cutting station swivels about at least one axis. The cutting plane can accordingly be adjusted by swiveling the cutting means and/or swiveling the brick by means of the tilting table.

According to a preferred embodiment of the invention, a first cutting station along the conveying path has a horizontal saw with a saw blade in a horizontal plane. If the rotational axis of the saw blade is adjustable, this means that the saw blade is disposed horizontally in the starting position of the horizontal saw, or can be brought into such an alignment. To attain high cutting powers, the horizontal saw can preferably be moved back and forth translationally at right angles to the conveying path. The saw blade can be moved into the solid piece by a plunge cut, considerably accelerating the cutting process. The horizontal cut can also be effected by pushing bricks to be cut along the conveying path through the saw blade, whereby the saw blade can stand still (apart from its rotary cutting motion). This cutting control is particularly efficient in the case of a whole wall row whose height must be cut. The contiguous bricks of the total row can be pushed successively through the horizontal saw without removing the saw blade and interrupting the cutting process.

In order to cool the saw blade sufficiently in the case of horizontal cutting control, it is provided according to a further aspect of the invention to dispose radial channels in the saw blade as saw blade cooling through which a cooling fluid can be supplied to sawteeth on the circumference of the saw blade.

The coolant, in particular water, is conveyed by the centrifugal force of the rotating saw blade and leaves the saw blade at the sawteeth. This coolant supply has special advantages independently of the abovementioned features of the apparatus and substantially increases the stability of the blade. The channels for supplying cooling fluid are preferably disposed in a star shape.

Both a crosscut into the solid piece (plunge cut) and a horizontal cut with normal cooling whereby fluid is sprayed on the saw before the blade enters the brick are problematic, not only because of the lack of cooling effect but because of the problems of getting enough flushing water into the cutting area for removing cutting sludge. This sludge builds up on the saw so that the saw presses instead of cutting. Precisely this problem is solved by the proposed cooling with star-shaped channels. The saw blade cooling thus acts simultaneously as a flushing device that conveys cooling or cutting fluid to the cutting place.

The channels can be covered on the outside and extend within the saw blade, in particular in the core layer of the saw blade in case of multilayer saw blades, the outlet opening of the channel being provided in the sawtooth area. This allows coolant to be guided selectively into the cutting area.

At least one of the cutting stations can have a swiveling apparatus for swiveling the cutting planes. The cutting station can be a saw with a saw blade adapted to swivel and/or travel in a plurality of axes.

A further preferred embodiment of the invention is that a second cutting station has a crosscut saw, in particular a vertically feedable cutoff saw, with a saw blade in a vertical plane. With the vertical feed of the saw blade, the latter immediately cuts into the solid piece, obtaining a considerably higher cutting power than a portal saw, which would always first begin cutting on an edge of the brick when crosscutting the bricks.

To permit any side or end contours to be cut, the cutting plane of the second cutting station can advantageously swivel about a vertical axis.

The described embodiments with more than one cutting station have the advantage that very high plant capacities can be attained. In contrast, the embodiment with only one cutting station has the advantage of substantially lower overall size. Secondly, the attainable quantity of cut bricks is sufficient for most cases since the usually batchwise demand for one type of cut, for example the horizontal cut for the uppermost wall panel row, means that the second saw is not needed.

To make cutting efficient, the cutting station can be followed by a buffer for cut bricks. In connection with the cut on the basis of an averaged brick size, the cutting station can cut quasi continuously even when no cut bricks are required at the moment. Cutting can thus be done working up a stock. If the bricks processed are ones without tolerances, e.g. made of chalky sandstone, no devices for compensating tolerances are required.

In a development of the invention, the line-up path is further preceded by a buffer for no-cut bricks. Said buffer can be disposed in particular between the cut brick buffer following the cutting station, and the line-up path. The buffer used is preferably a lifting table. The depiling gripper can accordingly always set down all gripped bricks. Bricks not required at the moment are lowered by the lifting table so that only the other bricks of the brick row gripped by the depiling gripper are lined up on the line-up belt.

To relieve the carrying capacity of the depiling robot in charge of supplying the saws, the conveying path is advantageously preceded by a buffer for bricks to be cut. The buffer can have a plurality of pockets each having whole bricks or partial bricks of different sizes. In a preferred embodiment, said buffer has at least three pockets, one for whole bricks, one for half bricks and one e.g. for ⅓ bricks.

According to the invention, the production of wall panels can be effected fully automatically with high productive capacity and precision, the wall panels having any configuration, in particular including window and door openings. According to the invention, sawing and lining up constitute two processes decoupled in time.

For storing piles of bricks in a magazine and making the particular required piles available for depiling for wall production, an automatic stacker crane is preferably provided that is controlled by the common control device.

The capacity of the inventive apparatus can be increased by providing two parallel cutting lines each with a line-up path, the two line-up paths being disposed on one and the other side of the bricklaying station and parallel thereto.

To adapt to the cut bricks required at the moment, bricks of different length and/or height can be supplied to the cutting station. This substantially minimizes waste.

Besides the at least one transport and holding device for supplying bricks to be cut via the cutting station to the buffer belt, at least one further transport and holding device can be provided for alternatively picking up bricks along the buffer belt and the line-up path, whereby the further transport and holding device can be lifted by at least one brick height and raised above bricks located on the line-up path. Lifting the bricks can be effected by the conveying grippers of the transport and holding device having vertically displaceable clamping jaws with a corresponding drive.

The at least one transport and holding device can thus be provided for transporting bricks to be cut along the conveying path to the buffer, and the at least one further transport and holding device for transporting cut bricks from the buffer to the line-up path. The line-up path can be formed by a conveyer belt or transport rolls.

Figure 3B:
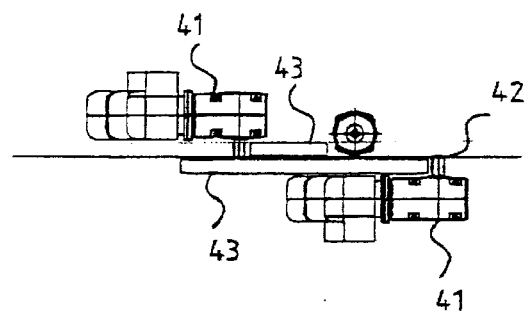
Figure 3A:
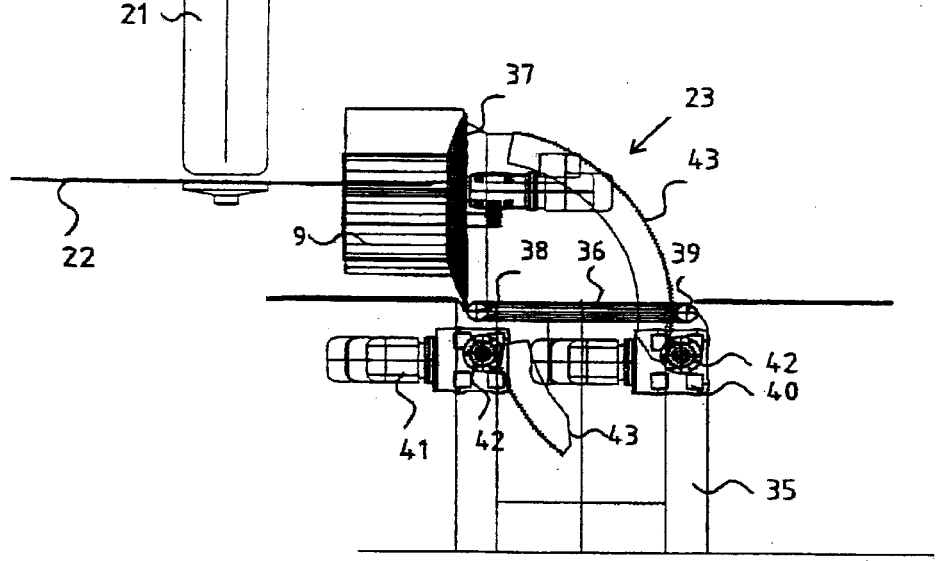
Figure 15:
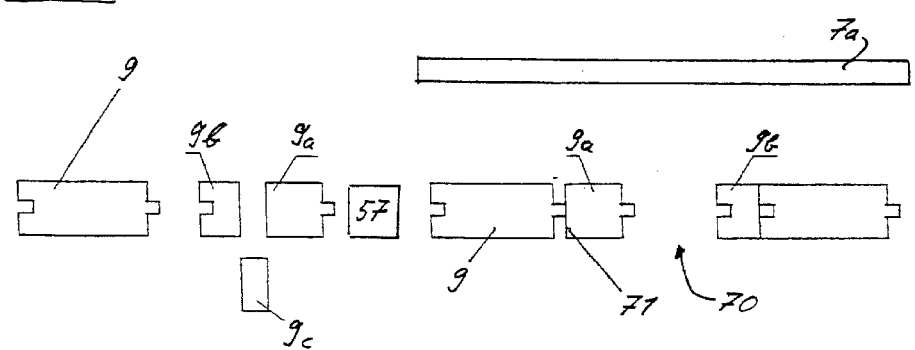
Figure 3E:
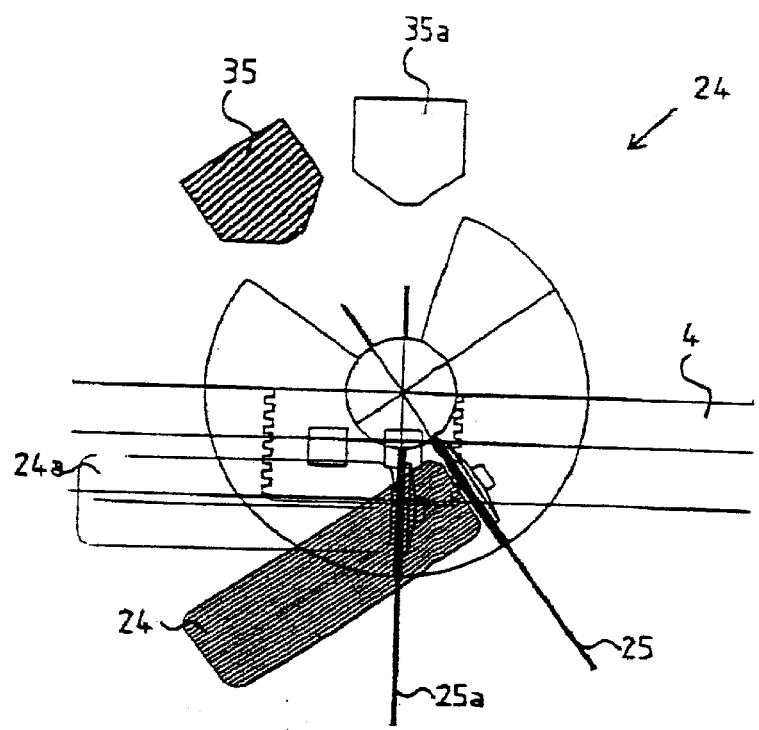
Figure 3C:
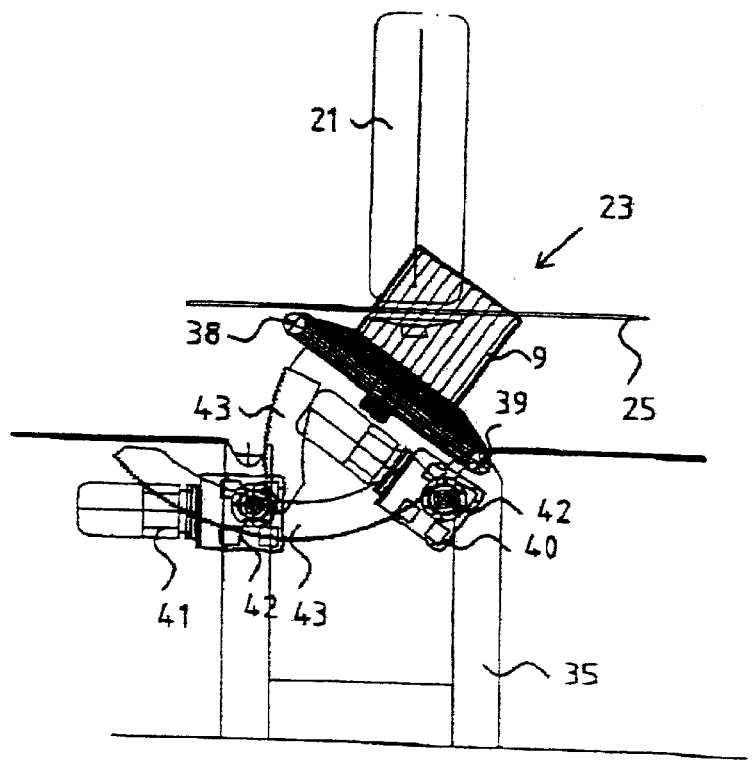
Figure 4:
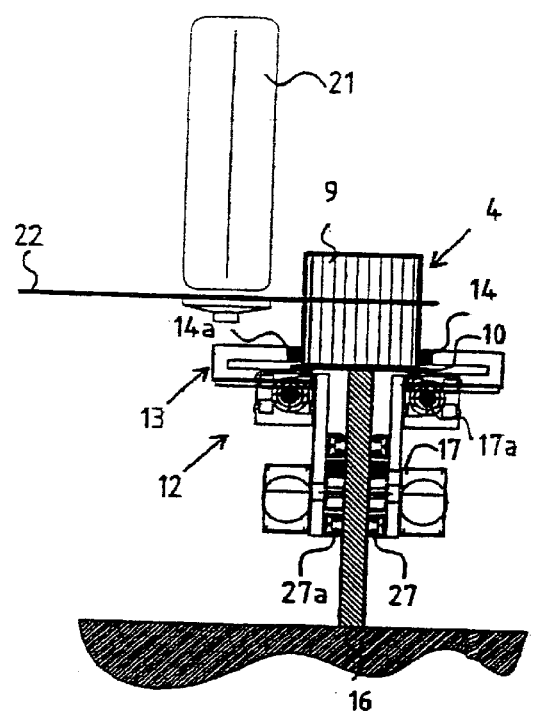
Figure 3D:
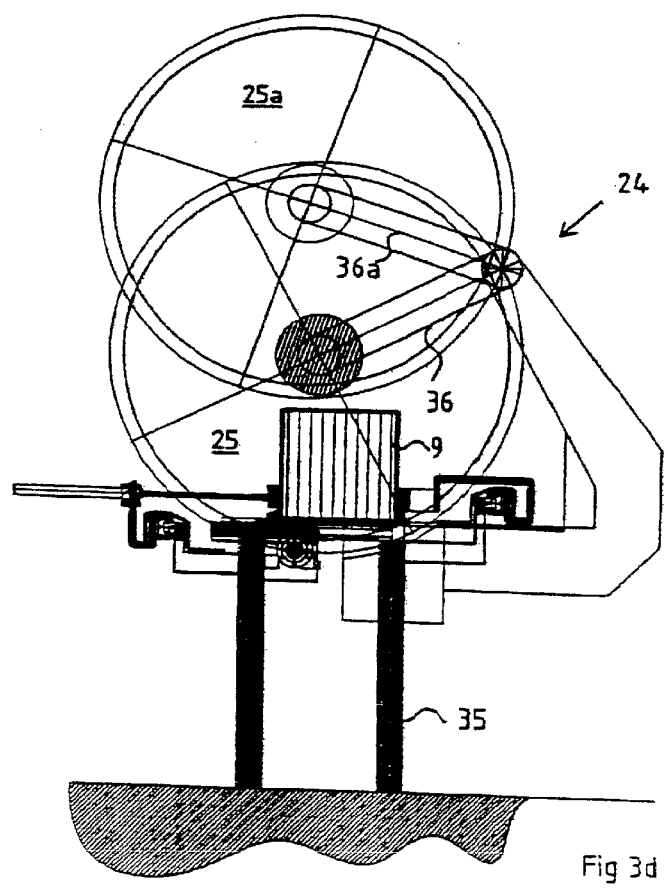
Figure 5:
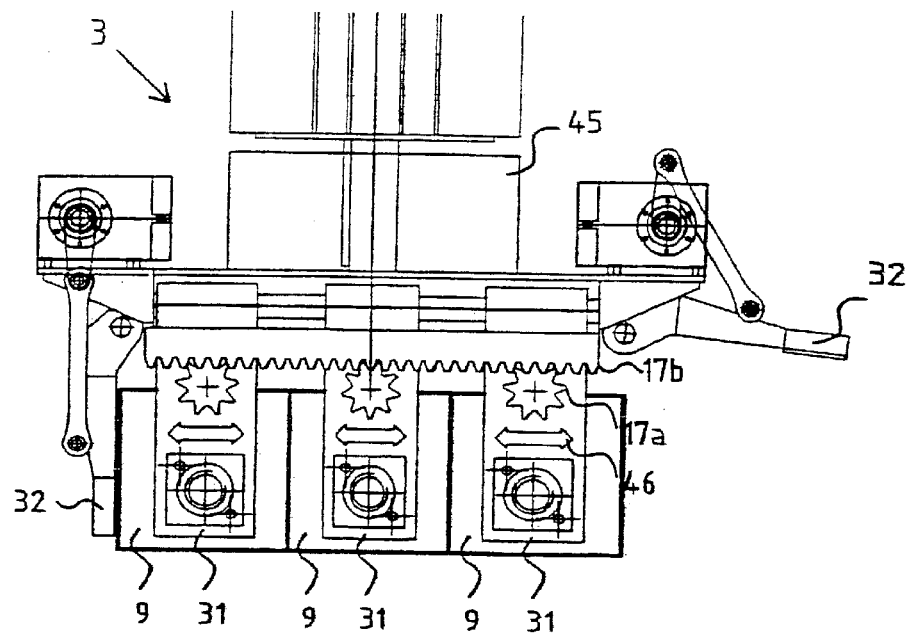
Figure 12:
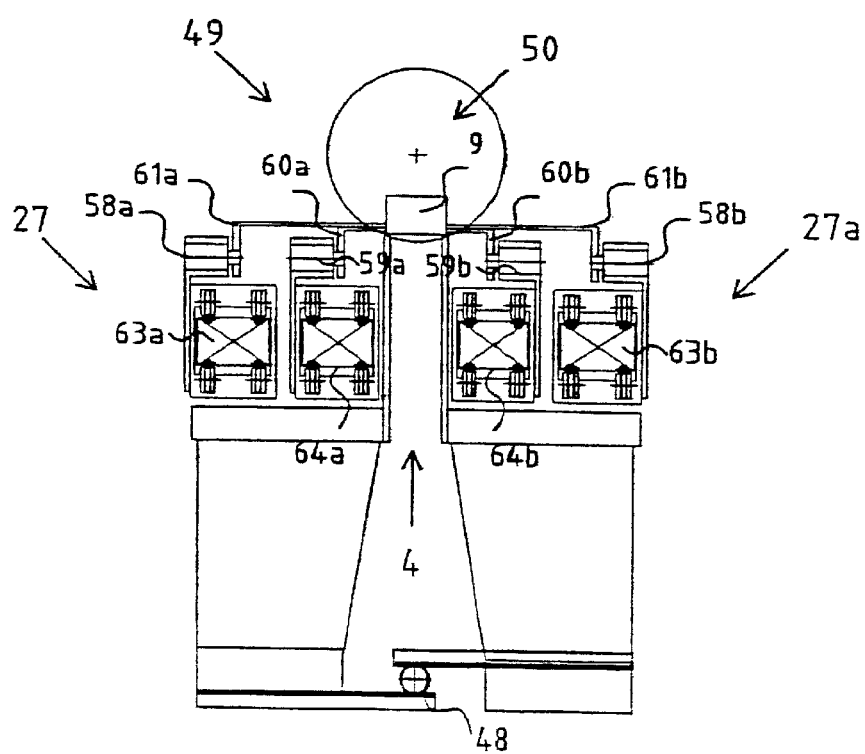
Figure 6:
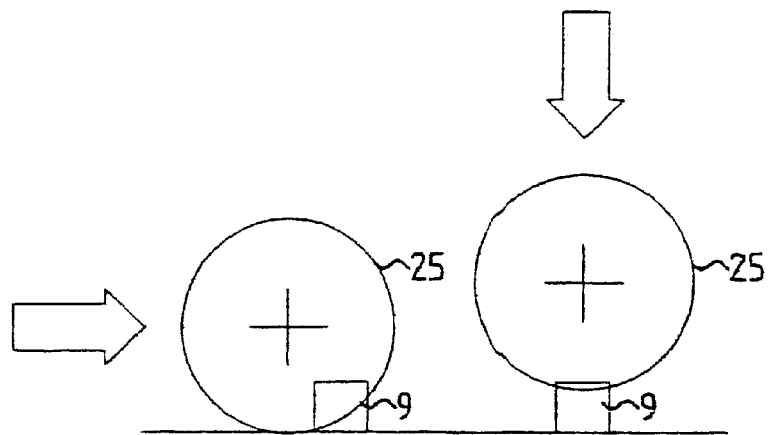
Figure 8:
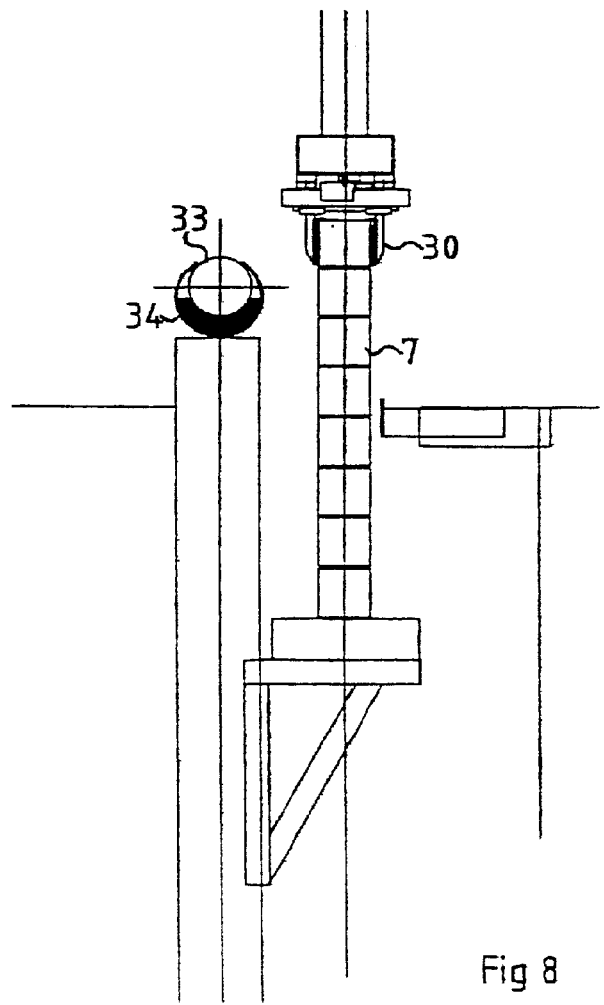
Figure 7:
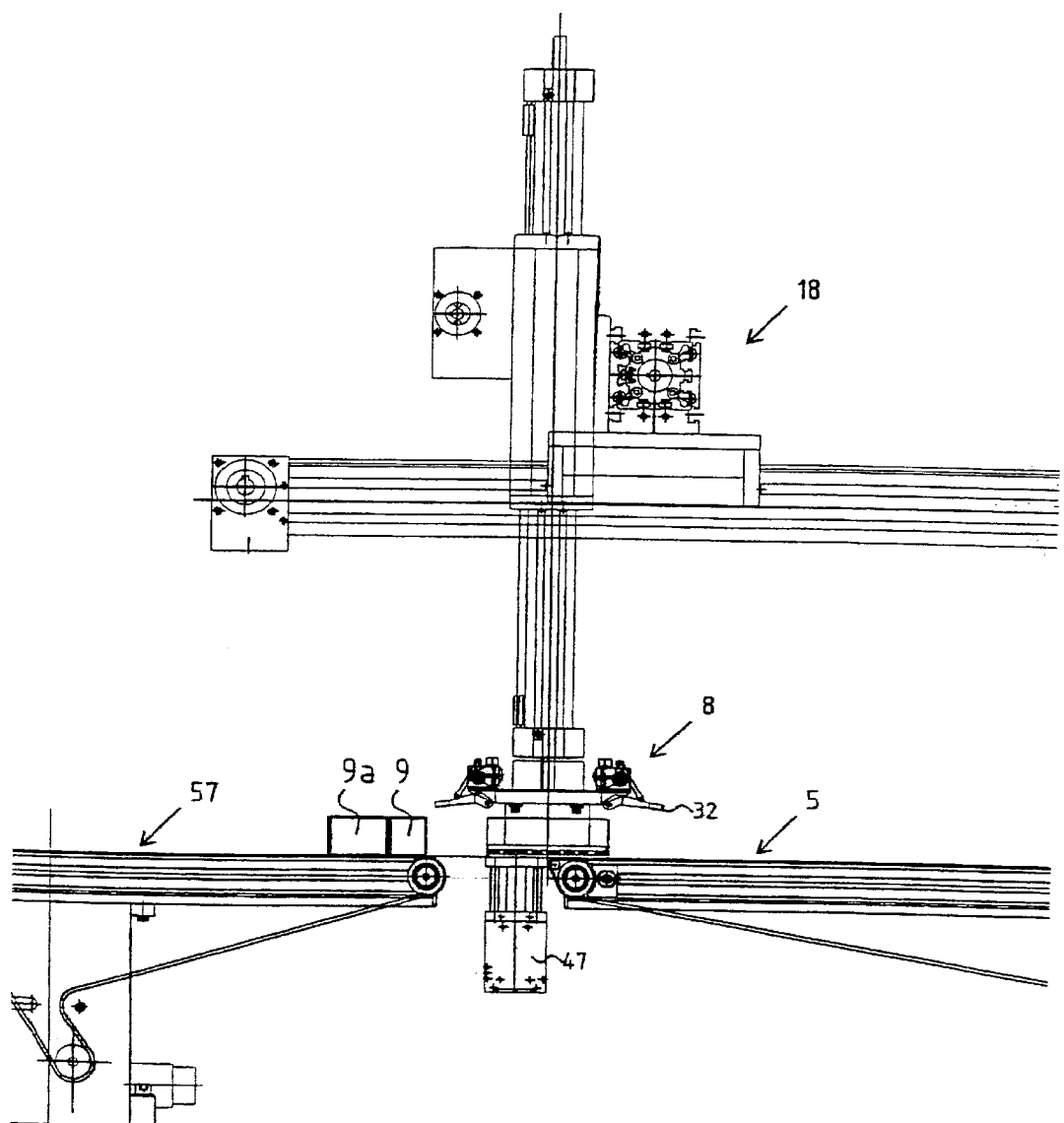
Figure 9:
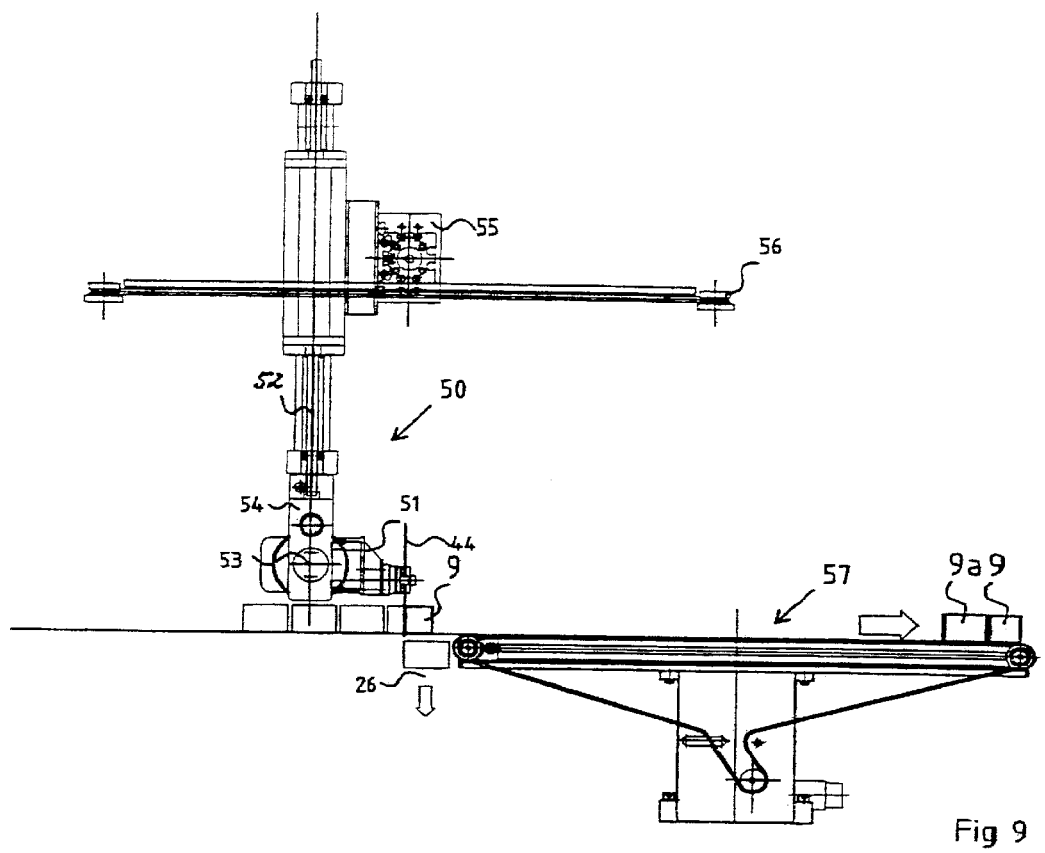
Figure 10:
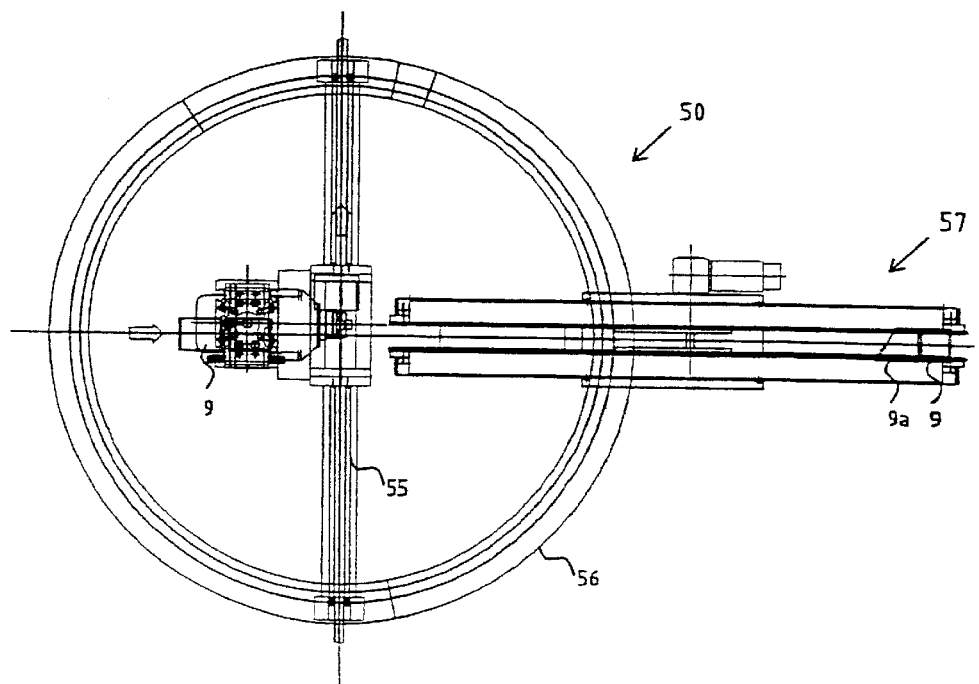
Figure 14:
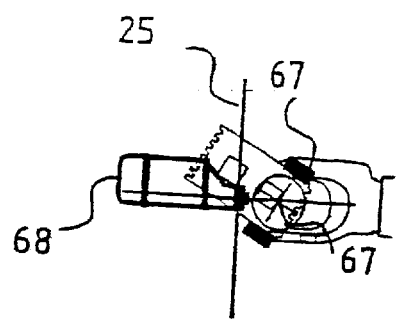
Figure 11:
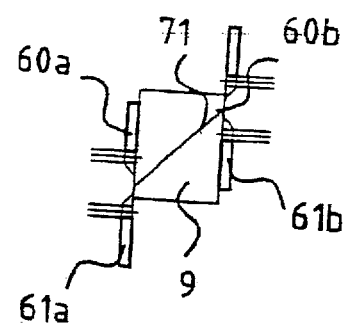
Figure 13:
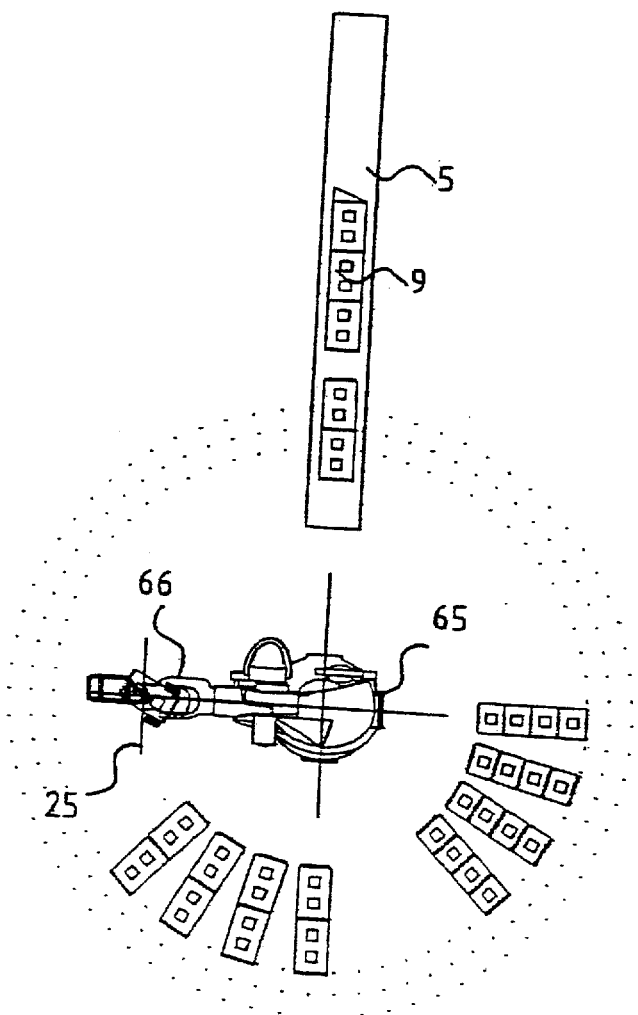

In the following the invention will be explained in more detail by way of example with reference to preferred embodiments and associated drawings, showing:

FIG. 1 a plan view of an apparatus for producing wall panels according to a preferred embodiment of the invention in an overall representation, FIGS. 2a and 2b plan views of a conveying path conveying bricks from a delivery station to a line-up path, two cutting stations or a universal cutting station being disposed along the conveying path, FIG. 3 a side view of the conveying path and the first cutting station disposed along said path with a tilting table in the area of the cutting station according to a first embodiment, FIG. 3a a side view of the conveying path in the area of the tilting table according to a further embodiment, the tilting table being shown in a schematic representation swiveled upward by 90°, FIG. 3b a plan view of the swiveling mechanism of the tilting table in a schematic representation, FIG. 3c a side view of the conveying path in the area of the tilting table like FIG. 3a but with the tilting table swiveled in the opposite direction to FIG. 3a, FIG. 3d a front view of the conveying path with the cutoff saw of the second cutting station, which is shown in two different positions, FIG. 3e a plan view of the cutoff saw of the second cutting station according to a further embodiment of the invention that shows the cutoff saw in different positions, FIG. 4 a sectional view through the conveying path in the area of the first cutting station, showing a transport and holding device with clamping means, according to a further embodiment of the conveying apparatus, FIG. 5 a side view of a depiling gripper according to a preferred embodiment, FIG. 6 a schematic functional representation of a cutoff saw (on the right) in comparison to a portal saw (on the left), FIG. 7 the depiling gripper setting down the depiled brick row on the line-up path that is preceded by a lowerable buffer, according to a preferred embodiment of the invention, FIG. 8 a front view of a bricklaying station with an applying apparatus for applying binder or mortar to the brick rows to be walled up, FIG. 9 a side view of the cutting station according to a further preferred embodiment of the invention wherein the cutting station has a universal saw with a multiaxially swiveling saw blade and the cutting station is followed by a buffer belt, the saw being shown in the position for a vertical crosscut, FIG. 10 a plan view of the cutting station showing in more detail the live ring in the portal of the mounting of the saw and its swiveling ability, FIG. 11 a plan view of the clamping jaws of the conveying apparatus according to FIG. 12, the clamping jaws being positioned for a bevel cut, FIG. 12 a front view of another embodiment of the conveying apparatus in the area of the cutting station according to a preferred embodiment of the invention, FIG. 13 a plan view of an elbow arm robot with a cutting station, FIG. 14 an enlarged view of the cutting station of the gripper of the elbow arm robot according to FIG. 13, and FIG. 15 schematically the rearrangement of cut bricks.

The apparatus for producing wall panels shown in FIG. 1 has magazine 1 in which bricks to be processed are delivered from the brickworks in the form of palletized brick piles 2. The position of individual brick piles 2 in magazine 1 is stored by a data processing system not shown. According to the required types of brick, brick piles 2 are deposited in the working area of two depiling grippers 3 and 8. To reduce the carrying capacity of depiling gripper 3, buffer 28, 29 with three pockets is provided, one for whole bricks, one for half bricks and one for ⅓ bricks.

Brick piles 2 coming from the brickworks on a truck are preferably unloaded from the truck with an automated stacker crane (not shown) and stored in magazine 1. At the request of the bricklaying apparatus, brick piles 2 of the desired type of brick are then removed automatically from magazine 1 and made available in the working area of depiling grippers 3 and 8. There may optionally be only one depiling gripper. Brick piles 2 are preferably made available from magazine 1 with an automatic stacker crane not shown. This has the advantage that brick piles 2 can be made available at the required speed so as to prevent a standstill of the bricklaying apparatus due to brick piles 2 not being supplied in time. In addition, the corresponding personnel for making brick piles available is saved.

Depiling gripper 3 can be used to lift individual bricks 2 from brick pile 2 and feed them to conveying path 4.

Along conveying path 4, bricks 9 are cut to the desired format. Cut bricks are transferred from conveying path 4 to subsequent line-up path 5 from where they are walled up into wall panels 7 in bricklaying station 7a. Cut bricks coming from conveying path 4 are brought together on line-up path 5 with uncut bricks that are fed to line-up path 5 by further depiling gripper 8 directly from brick pile 2 made available.

In the following, the cutting of bricks 9 along conveying path 4 will be explained in more detail.

Depiling gripper 3 or identically designed gripper 8 grips with its longitudinal grippers 32 and cross jaws 31 (FIG. 5) row by row into bricks 9 disposed in brick pile 2 and sets them down on conveying path 4.

Conveying path 4 can be formed as chute 10. In order to move bricks 9 forward on conveying path 4, transport and holding device 12 with conveying gripper 13 is provided (FIG. 4). Conveying gripper 13, which is adapted to travel along conveying path 4, has a pair of clamping jaws 14, 14a that engage around brick 9 and clamp it at right angles to the conveying direction. Clamping jaws 14, 14a are held below conveying path 4 by conveying gripper 13 that runs on rails 27, 27a disposed below conveying path 4 (FIG. 4).

Conveying gripper 13 includes two slides with running wheels and, on each side of pillar 16, preferably separately driven drives provided with a positioning apparatus that firmly embrace accordingly formed slideway or track 27, 27a from each side and run along it. Conveying gripper 13 is thus of bipartite design, the two parts running on each side of pillar 16 that also carries conveying path 4, i.e. chute 10 (FIG. 4).

Alternatively, guide rails adjustable in the transverse direction of conveying path 4 with driven conveying slides running thereon can be provided to adapt to different brick widths. The conveying slides have clamping devices integrated therein (FIG. 12). Upon a change of brick width the distance of the guide rails is adapted accordingly.

Along conveying path 4, two cutting stations 19 and 20 are provided according to FIGS. 1 and 2a for cutting bricks 9 to the desired format.

First cutting station 19 regarded in the conveying direction includes horizontal saw 21 formed as a vertically adjustable circular saw (FIGS. 3 and 4). Circular saw blade 22 of horizontal saw 21 is disposed in a horizontal plane. Horizontal saw 21 is movable back and forth at right angles to the conveying direction, i.e. from the left to the right according to FIG. 2a, to permit cutting into solid brick 9 by a plunge cut.

Bricks 9 can also be pushed on conveying path 4 through saw blade 22 previously positioned accordingly if horizontal saw 21 does not move. This permits high cutting powers to be achieved in particular in the horizontal sawing of whole rows of bricks.

Bricks 9 are cut with horizontal saw 21 while lying directly on conveying path 4, no further handling steps being necessary. Conveying path or chute 4 serves as a cutting table in cutting station 19. Bricks 9 are brought into the corresponding cutting position by clamping jaws 14 and clamped therein. After the cutting process, transport and holding device 12 conveys cut brick 9 clamped into clamping jaws 14, 14a. Bricks 9 to be cut are thus gripped by jaws 14, 14a of transport and holding device 12, moved along conveying path 4 to cutting station 19 with horizontal saw 21, cut in cutting station 19 in the same clamping and moved on in the same clamping. No rechucking of bricks 9 for the cutting process is necessary.

In order to increase capacity, the transport and holding device can consist of two conveying grippers. While one conveying gripper is holding the brick in the saw, the second conveying gripper suitable for overtaking can grip the brick.

The first conveying gripper can now release the brick and return to get the next brick. Here, too, the brick to be cut is thus cut in the required cutting planes at the cutting station in the state as clamped in the transport and holding device.

To permit execution of bevel cuts, conveying path 4 is interrupted in the area of cutting station 19. At the place of interruption the bricks run over tilting table 23 (FIG. 3) that can be tilted about a horizontal axis at right angles to the conveying direction of conveying path 4 and brings the bricks into the desired inclined position. Tilting table 23 is tiltable by at least +/−45° so that bricks 9 can be cut for walls adjoining roof slopes, in another embodiment tiltable by 90° so that cuts can be performed in mutually perpendicular planes.

The traveling transport and holding device according to FIG. 3 is driven by a drive traveling therewith that is supported on rack 17. Slideway 27 is partly stationary and partly tiltable together with tilting table 23. The transport and holding device is able to move from the stationary to the tiltable part.

An embodiment of tilting table 23 is shown in more detail in FIGS. 3a–3c. Tilting table 23 has base 36 formed substantially as a plate. Axles 38, 39 extending at right angles to the conveying direction are fixed to both ends of base 36. Said axles rest in bearing shells connected with pillars 35. For swiveling up the tilting table, the top of the bearing shell located opposite the particular swivel axis is swung away so that base 36 can be opened like a wing in the manner of a book cover.

Tilting table 23 rests on the side of swivel axle 38 on corresponding pillar 35 and can be lifted thereoff, while the other side of tilting table 23 is connected with other pillar 35 so as to swivel about swivel axle 39 but not be lifted off.

Tilting table 23 has two pivot drives 40, 41 that swivel support 37 about swivel axle 38 relative to base 36, or swivel base 36 together with support 37 about fixed swivel axle 39. The pivot drives each have driving pinions 42 cooperating with swivel tongues 43 firmly connected with base 36 or support 37 and curving in an arc shape about particular swivel axle 38, 39.

Actuating pivot drive 40 swivels swing table 23 in one direction (FIG. 3a) and actuating other pivot drive 41 swivels it in the other direction (FIG. 3c). Actuating both pivot drives 40, 41 permits swing table 23 to be vertically adjusted.

To permit bricks 9 swiveled on tilting table 23 to be cut in different swivel positions, horizontal saw 21 is expediently also adjustable in an axis parallel to the conveying direction.

Transport and holding device 12 can run with clamping jaws 14 over tilting table 23 in the untilted state thereof and be tilted together with the tilting table so that bricks 9 are held and clamped by clamping jaws 14 even when tilted so that no rechucking of bricks 9 is required.

If L cuts are to be performed in cutting station 19 for example, a horizontal cut is executed in a first operation. After horizontal saw 21 has returned, brick 9 is then turned by 90° via tilting table 23 to complete the L cut in a second cut.

The two cuts necessary for an L cut can preferably also be performed in two different cutting stations so that no tilting of brick 9 is required.

To permit cutting in virtually any cutting planes, it can be provided that horizontal saw 21 is likewise formed to swivel. Horizontal saw 21 can expediently be formed to tilt about a vertical axis perpendicular to the tilting axis of tilting table 23.

To permit sufficient cooling of saw blade 22 of horizontal saw 21, radial star-shaped fluid channels are provided within saw blade 22 through which cooling fluid can be supplied to the sawteeth of saw blade 22. Water as cooling fluid is expediently guided into the channels through a rotary transmission leadthrough, then leaving in the sawtooth area and effecting the required cooling of the total blade. Saw blade 22 can have a three-layered construction, in particular having a central copper body plated with steel to obtain corresponding silencing. Saw blade 22 with internally extending cooling channels can be produced especially advantageously by milling the channels extending in a star shape into the central copper body and then mounting the steel plates on the copper body, thereby closing the cooling channels.

Obviously, not only saw blade 22 of horizontal saw 21 can have such saw blade cooling, i.e. with radial channels in the saw blade through which cooling fluid can be supplied to sawteeth on the circumference of the saw blade. Each brick saw of the inventive apparatus or of any other apparatus can also be equipped with such saw blade cooling.

As FIGS. 1 and 2a show, cutoff saw 24 is provided in second cutting station 20 located behind cutting station 19 in the conveying direction, its circular saw blade 25 extending in a vertical plane. Cutoff saw 24 swivels about a vertical axis so that saw blade 25 is operable not only in the position disposed at right angles to the conveying direction as shown in FIG. 2, but also in an inclined position for miter square cuts (cf. 24a in FIG. 1).

Cutoff saw 24 is movable up and down in the vertical direction so that the crosscuts can be done into the solid piece. This obtains substantially higher cutting power (FIG. 6, right side). If saw blade 25 were fed horizontally at right angles to the conveying direction in cutting station 20, as is the case with a portal saw and is shown on the left side of FIG. 6 for comparison, only one corner of brick 9 would always be cut first so that reduced cutting power would be attainable.

In cutting station 20 a rotary table can also be provided that can rotate the bricks to be cut about a vertical axis relative to the alignment of saw blade 25 to permit adjustment of the desired miter square.

As FIG. 3e shows, cutoff saw 24 can also swivel about a vertical axis so that bevel crosscuts can be performed. The swivel axis of cutoff saw 24 is within the stop edge of conveying path 4. The latter need only have a gap for passage of saw blade 25 in all angular positions, as FIG. 3e shows.

Saw 24 can expediently be hinged to swivel arm 36 for moving saw blade 25 or whole cutoff saw 24 up and down to permit crosscuts to be done into the solid piece, as FIG. 3d shows.

As previously in cutting station 19, bricks 9 are cut directly on conveying path 4 and held and clamped by clamping jaws 14, 14a of transport and holding device 12 in cutting station 20. Bricks 9 to be cut are thus moved along conveying path 4 while clamped in jaws 14, 14a of transport and holding device 12, and the particular brick cut in the required cutting planes successively in the same clamping.

The transport and holding device can comprise two conveying grippers. While one conveying gripper is holding the brick in the saw, the second conveying gripper suitable for overtaking grips the brick. The first conveying gripper can now release the brick and return to get the next brick.

Cuts in three dimensions can be executed in the described way, being made possible by corresponding inclined positioning of the saw blades or the tilting table. Complicated cutting geometries can be required in particular for bays with eaves.

Cutting stations 19 and 20 are driven by a central controller not shown in detail, preferably in dependence on the detected actual sizes of bricks 9. The sizes of bricks 9 can be detected for example by depiling gripper 3 when depiling from brick piles 2, as to be explained in more detail.

After cutting station 20, opening 26 is left free in conveying path 4 for discarding useless residual brick accumulating during cutting. While the useful brick gripped by traveling conveying gripper 15 is being transported over opening 26 in conveying path 4, it pushes the non-gripped residual brick ahead. As soon as opening 26 is reached, the residual brick drops into the waste. Cut bricks are deposited by conveying grippers 15 beyond waste opening 26 on the end of buffer path 37 preferably executed as a conveyer belt. A following cut brick is set down before the previously set down cut brick in the flow direction for the next cutting process.

This process is repeated until buffer path 57 is full. At the same time, whenever a cut brick is required, the last brick downstream is picked up by a second transport and holding device, not shown in FIG. 1 and corresponding to device 12 according to FIG. 4, and deposited at its intended place on line-up belt 5 beyond lowerable whole-brick buffer 47.

Bricks 9 that can be processed uncut are set down directly on line-up path 8 by second depiling gripper 5.

To detect material-induced dimensional imperfections of bricks 9 and permit their compensation during cutting of the final bricks of a wall panel row, i.e. the bricks to be cut off accordingly longer or shorter, the actual length of the brick row lifted off brick piles 2 is measured while it is gripped by depiling gripper 8. For this purpose, in particular the actual distance of gripper jaws 32 after clamping the brick row is measured.

FIG. 5 shows depiling gripper 3 in detail. It preferably has gripper pair 32 which grips in the longitudinal direction of brick rows 9 of brick pile 2, and a plurality of gripper pairs 31 at right angles thereto. This permits a brick row to be picked up and gripped in the longitudinal direction of the row and then regripping to be performed, preferably in the air. Either all or only individual bricks 9 of a row of brick pile 2 can be set down.

As FIG. 5 shows, longitudinal grippers 32 are hinged to swivel on carrier 45 of depiling gripper 8. Longitudinal grippers 32 can be used to remove a whole brick row from brick pile 2 (FIG. 1), thereby pressing bricks 9 of a row against each other.

Cross jaws 31 of depiling gripper 3 or 8 grip at right angles to the gripping direction of longitudinal grippers 32 and are likewise hinged to swivel on carrier 45. They can in particular be swiveled away upward so that they are not in the way during gripping of a brick row on the brick pile. Additionally, the jaws of transverse grippers 31 are adapted to travel in the longitudinal direction, that is, in the gripping direction of longitudinal grippers 32, the pairs being in synchronism so that bricks gripped by transverse grippers 31 can be pulled apart when longitudinal grippers 32 are moved away. The traveling direction of transverse grippers 31 is marked by reference sign 46 in FIG. 5. Transverse grippers 31 are thus guided along carrier 45, being driven by pinions 17a engaging rack 17b extending along carrier 45.

The position of a gripped brick row can be displaced toward the center axis of depiling gripper 3, 8. The actual position can be determined from measurement of the angles of longitudinal grippers 32. For setting down the gripped bricks, the target coordinates for depiling gripper 3, 8 are corrected in accordance with the measured deviation.

The longitudinal dimensions of depiled bricks 9 determined by depiling gripper 3, 8 are supplied to the central controller. The latter determines therefrom an average brick length, after adding a tolerance dimension for overlong bricks. The value of the average brick length can be corrected successively, the more bricks have been depiled. On the basis of the determined average brick length, the controller drives cutting stations 19, 20 that perform the cutting of bricks 9. The cutting, in particular crosscutting, of bricks 9 is thus effected in dependence on the determined brick length. The deviation of the average brick length from the actually measured brick length is taken into account when lining up bricks 9 in line-up path 5.

In particular, whole bricks fed by depiling gripper 8 directly to line-up path 5 are pulled apart by cross jaws 31. The precisely desired length of a wall panel row is thus obtained, firstly, by adding a cut brick and, secondly, by pulling apart the bricks of each brick row removed from the pile. However, pulling apart only compensates the brick tolerances not compensated by the cut bricks.

Whole bricks 6 are thus deposited by depiling gripper 8 directly on line-up belt 5 in the required number. If fewer than the total quantity of whole bricks taken by depiling gripper 8 from pile 2 are required, the rest is deposited on lowerable buffer 47. When a cut brick is subsequently required, it is picked up from buffer 47 with transport and holding device 34 and added to the previously deposited whole bricks on line-up belt 5. Before each brick is deposited, line-up belt 5 is clocked further by the measure of the brick length of the next bricks.

The subsequent supply of cut bricks allows maximum utilization of the cutting stations and accordingly a very efficient supply of bricks. Direct deposit of whole bricks on line-up path 5 on the shortest path from brick pile 2, without any intermediate conveying devices, provides high dimensional accuracy in positioning the bricks.

According to an advantageous embodiment of the invention, lowerable buffer 47 serving as a bank for no-cut whole bricks can thus be disposed before the line-up belt of line-up path 5, as FIGS. 1 and 7 show. Depiling gripper 8 can then always grip and set down a whole row of bricks 9 from brick pile 2. If only one or two bricks are required for the brick layer being walled up, however, the bricks not required are deposited on lowerable buffer 47 before the beginning of the belt of line-up path 5. The two whole bricks 9 not required according to FIG. 7 are lowered with buffer 47, thereby clearing the way for a cut brick cut on conveying path 4, as to be explained. When a whole brick is needed again, buffer 47 rises and the whole bricks buffered thereon are lined up on the belt of line-up path 5.

Lowerable buffer 47 is optional, i.e. if it is omitted depiling gripper 8 must temporarily store whole bricks not required beside conveying path 4.

The described handling and cutting of bricks achieves high productive capacity and efficiency. Tolerances of the bricks can be automatically compensated.

A particular advantage is that the described method and apparatus can process small bricks without reducing the productive capacity, for example bricks that are 25 centimeters long that result in little waste during cutting. The same capacity is achieved because depiling gripper 3 or 8 always removes a total brick row from stack 2 or 2a, 2b . . . It has no influence on capacity whether the bricks gripped are e.g. 2×50 cm long or 4×25 cm long. The number of transverse grippers 31 is selected to be as great as the maximum number of bricks per row. Even in the case of horizontal cuts, shorter bricks do not increase the cutting time if conveying gripper 13 or its clamping jaws 14, 14a are as long as one pile row.

Bricks 9 of piles 2 can have a certain height (for example 25 centimeters). Since many individually cut bricks must be cut horizontally to a height that is lower than the standard height of a whole brick, and since many bricks must be crosscut to a length that is lower than the standard length of the bricks, it is advantageous for avoiding brick waste to set down further brick piles 2a, 2b, 2c, 2d in the gripping area of depiling grippers 3 and 8 that have a lower height or length than bricks 9 of piles 2, in particular half the height thereof.

To minimize waste, bricks 9 of different height can thus be used e.g. for horizontal cuts in cutting station 19. Bricks of different length can likewise be used for reducing the cutoff with cutoff saw 24. Bricks of different length can already be fed to conveying path 4 before cutting station 19, but in particular before cutting station 20.

Buffer 29 for bricks to be cut is advantageously added before the beginning of conveying path 4 to minimize waste during cutting. A possible embodiment is sliding table 29 displaceable according to double arrow 28 and having rakelike brick bins about 10 centimeters wide. The individual prongs opening toward conveying path 4 are provided for different brick dimensions. The depiling robot deposits bricks of different length and height on the prongs. Sliding table 29 travels into the particular position so that the prong with currently required bricks is in line with conveying path 4. Holding and transport device 12 moves into the prongs and picks up the required bricks.

FIG. 1 shows an optionally employable second cutting line for increasing productive capacity (designations having index a). Line-up paths 5, 5a of the two cutting lines extend parallel to bricklaying station 7a.

Further, FIG. 1 shows bricklaying station 7a with transfer robot 30 with transfer gripper for picking up the lined up bricks from belt 5 (or 5a)—optionally alternately if there are two cutting lines—and walling them up to form wall 7 on bricklaying station 7a, previously incorporating mortar or another binder.

FIG. 8 shows the application of binder. Cylinder 33 is driven in synchronism with the motion of the brick row while the brick row gripped by transfer robot 30 is moved from line-up path 5 over cylinder 33 at right angles to the axis of cylinder 33. This permits binder to be applied to the underside of the brick row in time-saving fashion.

Cylinder 33 is received rotatably in mortar or binder storage vessel 34 into which cylinder 33 dips so that the rotation of cylinder 33 causes binder or mortar to be conveyed onto the free upper side of cylinder 33 (FIG. 8). Since the brick row is moved transversely over cylinder 33, binder or mortar can be applied very efficiently within a short time. Cylinder 33 has a length corresponding to the maximum length of the brick row lined up on line-up path 5.

Further preferred embodiments of the invention will be described in the following. Apart from the special comments made on these embodiments, they match the above-described example.

One embodiment of the invention differs fundamentally from the above-described example in that instead of the two cutting stations only one cutting station 50 is provided (FIGS. 2b, 9, 10, 12). Cutting station 50 has universal saw 51 for performing all required cuts.

Saw 51 is fastened to swivel on the end of vertical robot axle 52 (FIG. 9). Swivel axle 53 of saw 51 is perpendicular to vertical robot axle 52. Besides the swivel motion about swivel axle 53, saw 51 can firstly be moved up and down along vertical axle 52. Secondly, saw 51 can be rotated about vertical axle 52 and brought into any angular positions. For this purpose, saw 51 can be swiveled relative to vertical carrier 54 or, in an alternative embodiment, total vertical carrier 54 can also be rotated. Vertical carrier 54 is fastened to portal 55 that is turn adapted to travel. As FIGS. 2b and 10 show, horizontal portal 55 forms the diagonal of live ring 56 and can be brought by live ring 56 into any angular positions. Vertical carrier 54 can also be adapted to travel along portal 55. This permits saw 51 to be brought into any positions; all cuts essential for wall production can be realized.

If saw 51 is rotated about vertical axle 52 in the conveying direction of bricks 9 on conveying path 4 and tilted about swivel axle 53, an eaves trough cut can be performed, whereby brick 9 is cut off diagonally in its height parallel to the eaves trough of the building, that is, a horizontal bevel cut is performed.

Vertical cuts can also be performed in clamped brick 9 in the longitudinal direction of the wall, for example for the rear wall of subsequently milled out electrical distribution niches. For this purpose, saw 51 is swiveled about swivel axle 53 according to FIG. 9 so that saw blade 44 is vertically aligned.

Such a cut can optionally be combined with a horizontal cut so that a brick with an L-shaped profile can be cut out.

To perform vertical bevel cuts for bays or out-of-square adjoining walls, horizontal axle or portal 55 can be rotated accordingly, as FIG. 10 shows. The vertical cuts can be performed as plunge cuts, saw 51 being fed along vertical axle 52. Alternatively, saw 51 can be made to travel together with vertical axle 52 along horizontal axle 55 and thus moved into brick 9.

Whenever possible, cutting is done into the solid piece by a plunge cut to save time (FIG. 6). A crosscut is therefore performed by moving the saw along vertical axle 52. When a bevel cut with a vertical cutting plane is to be performed, the saw blade is not large enough to cut by a plunge cut. In this case, cutting is done with feed along staggered horizontal (diagonal) axle 55.

To permit continuous operation of cutting stations 19, 20 and 50, cutting stations 19, 20 or cutting station 50 are followed according to FIGS. 1 and 9, in a development of the invention, by a buffer in the form of buffer belt 57 to which cut bricks 9a are fed.

From buffer belt 57 the cut bricks are then fed to line-up belt 5 and brought together there with the no-cut whole bricks. In particular in connection with the above-described cutting on the basis of averaged brick dimensions, buffer belt 57 obtains quasi continuous operation of cutting station 50. This is of advantage since cutting of the bricks is time-consuming and the cycle of cutting station 50 substantially determines the cycle of the bricklaying apparatus. Cutting of the bricks is thus effected in synchronism with lining up of the other bricks of a wall panel row, so that processing time can be saved.

Buffer belt 57 can consist of two parallel strands and thus be adjustable in width. Cut bricks are conveyed on buffer belt 57 up to the last brick set down thereon, and deposited on buffer belt 57. The belt moves on each time a brick has been taken at the downstream end of buffer belt 57.

As indicated by dash-dotted lines in FIG. 1, slideway 27, 27a extends from conveying path 4 to line-up path 5. Brick 9 located at the downstream end of buffer belt 57 can therefore be deposited by transport and holding device 34 at the relevant place on line-up path 5.

Transport and holding device 34 movable along slideway 27, 27a between buffer station 57 and line-up path 5 is used to add cut brick 9, 9a to last brick 9 on line-up path 6 in the conveying direction, unless it is the first brick of the brick row. If the clamping jaws of the transport and holding device are vertically adjustable, cut brick 9 can also be added between two bricks on line-up path 5.

Thus, altogether three transport and holding devices 12, 12a are present: two transport and holding devices on conveying paths 4 and 4a, and transport and holding device 34 on line-up path 5. Transport and holding device 12, 12a is used to pick up bricks 9 to be cut from buffer 29, transport them to cutting station 19, 20, hold them during the cutting process, and then transport the cut bricks to buffer path 57. Lining up of cut bricks 9a with whole bricks 9 set down on line-up path 5 by depiling gripper 52 is thereupon effected with conveying gripper 34.

The transport and holding device can also be formed by an elbow arm robot. Bricks delivered in a pile are first singled in a way not shown in detail here. Elbow arm robot 65 shown in FIGS. 13 and 14 then grips brick 9 to be cut with gripper 67 mounted at one end of its rotary hand 66 and supplies it to saw 68 with saw blade 25. Saw 68 is preferably stationary, with elbow arm robot 65 moving brick 9 at cutting speed. After completion of a first cut and return of the brick from saw 68 until said brick is free, rotary hand 66 is rotated according to the desired new cutting plane and the brick supplied to saw 68 at cutting speed again in the second desired cutting plane, without opening gripper 67.

Elbow arm robot 65 thus picks up the particular brick from the rows of whole or half bricks disposed radially one behind the other, said rows being disposed in a segment shape in FIG. 13, rotates it into the desired cutting position, supplies it to stationary saw 68 at cutting speed and places cut brick 9 on line-up belt 5, all motions of the brick being effected by robot 65 without gripper 67 being opened. Alternatively, the saw can also be moved at cutting speed while the elbow arm robot holds the brick.

The central processing unit ensures that foremost cut brick 9 on buffer belt 57 in the conveying direction is ready when it is to be added to bricks 9 on line-up path 5.

The central processing unit also automatically controls all other processes that are performed by the inventive apparatus with bricks 9 from magazine 1 up to masoning at bricklaying station 7a.

FIG. 12 shows a further embodiment of the transport and holding device for conveying bricks 9 on conveying path 4.

Transport and holding device 49 according to FIG. 12 differs from that according to FIG. 4 substantially in that not only one conveying gripper formed as a slide with clamping jaws is guided on each side of conveying path 4 on the slideway with rails 63a, 63b, 64a, 64b, but two conveying grippers 58a, 58b or 59a, 59b formed as slides with clamping jaws 61a, 61b and 60a, 60b. Brick 9 can be clamped both with clamping jaws 60a and 60b and with clamping jaws 61a and 61b. Each guide rail 63a, 63b, 64a, 64b is double-tracked so that slide pair 58a, 58b with clamping jaws 61a, 61b, on the one hand, and slide pair 59a, 59b with clamping jaws 60a, 60b, on the other hand, can overtake each other. Slide pairs 53a, 53b and slide pairs 59a, 59b are adapted to travel along the slideway in synchronism.

To permit an offset arrangement of opposing clamping jaws 60a, 60b and 61a, 61b for bevel cuts, the electric synchronization can be eliminated.

As FIG. 12 shows, clamping jaws 60a, 60b or 61a, 61b grip particular brick 9 on opposing side cheeks just above the contact surface of brick 9 on chutes 4. This permits relatively deep cuts to be performed.

The distance between the left and right sides of chute 4 according to FIG. 12 can be adapted to the width of bricks 9 to be cut e.g. by means of rack mechanism 48.

In the area of cutting station 50 or a little downstream of cutting station 50, chute or conveying path 4 for cut bricks has opening 62 through which brick chips are discarded.

The two separately controllable right and left clamping jaws 60a, 60b and 61a, 61b, which are shown in a plan view in FIG. 11, are out of alignment in the case of a bevel cut in order to leave room for the passage of saw 51 to cutting line 71. Clamping jaws 60a, 60b and 61a, 61b are connected by individually drivable linear actuators e.g. in the form of pneumatic cylinders or electromagnetically.

Clamping jaws 60a, 60b and 61a, 61b are formed to be long enough to transport a whole brick row as gripped by depiling gripper 3 at one time. They can preferably be approximately one meter long. Cutting is preferably done at the front edge of the clamping jaws. Clamping jaws 60a, 60b and 61a, 61b are closed electromagnetically by individually drivable linear actuators e.g. in the form of pneumatic cylinders.

To permit the cutting process to be performed as fast as possible, a brick is first transported with first slide pair 58a, 58b to cutting station 50. During cutting, second slide pair 59a, 59b comes and grips the part of brick 9 to be cut off, thereby fixing the brick to be cut. In the meantime, first slide pair 58a, 58b lets go with clamping jaws 61a, 61b and moves back to the next cutting edge, which can be on the same brick or on a following brick. Clamping jaws 61a, 61b and 60a, 60b of different slide pairs 58a, 58b and 59a, 59b can travel through above or below each other (FIG. 12) so as to ensure that the clamping jaws can overtake each other. Clamping jaws 61a, 61b, 60a, 60b can be formed to be vertically adjustable to permit gripping of bricks 9 at different heights. This permits the upper cut-off part of brick 9 to be gripped after cutting in the case of a horizontal cut for example.

Slide pair 58a, 58b is used to transport the cut-off part of brick 9 over opening 62 and drop it there, or simply push it as far as the hole ahead of the useful cut brick. Other slide pair 59a, 59b is used to convey useful cut brick 9 onto buffer belt 57 and line it up there with cut brick 9 previously put down (FIG. 9).

As stated above in connection with slideway 27, 27a for transport and holding device 12 according to FIGS. 1 and 4, slideway 27, 27a for the transport and holding device according to FIG. 12 can likewise extend up to line-up path 5.

That is, transport and holding device 34 with clamping jaws is disposed so as to travel on slideway 27, 27a at the end of buffer belt 57, said device having the function of removing cut bricks from buffer belt 57 and fitting them in on line-up belt 5 at the place before the whole bricks intended by the controller. For conveying bricks on from buffer belt 57, one transport and holding device 34 with a clamping jaw pair is generally sufficient. Said clamping jaw pair can also transport the whole bricks buffered in lowerable buffer 47 (FIGS. 1 and 7) onto line-up belt 5 as soon as said whole bricks are needed again. Bricks 9a, 9 have been set down on buffer belt 57 by transport and holding device 12.

Slideway 27, 27a for brick transport and holding device 12 or 49 thus extends along conveying path 4 to line-up path 5 and intermediate buffer belt 57, which can be disposed on a straight line.

The two conveying grippers 58a, 58b or 59a or 59b traveling along slideway 27, 27a from buffer 28, 29 for bricks to be cut up to buffer path 57 are able to move past each other. This permits regripping of brick 9 to be cut from one conveying gripper 58a, 58b to the other conveying gripper 59a, 59b, but at cutting station 19, 20 the brick is always clamped in the transport and holding device formed by the two conveying grippers to be able to be cut in the required cutting planes.

However, third conveying gripper 34 performs the function of picking up cut bricks 9a at the downstream end of buffer path 57, transporting them beyond lowerable buffer 47 for whole bricks to line-up path 5 and lining them up at their intended position in the wall. Whole bricks are either set down on line-up path 5 directly by depiling gripper 32 at their intended position in the wall or deposited partly on lowerable buffer 47. Third conveying gripper 34 additionally performs the function of transporting whole bricks deposited on lowerable buffer 47 to line-up path 5 and lining them up with the bricks previously lined up.

To permit whole bricks to continue to be lined up in case of a bottleneck in the cutting area when all bricks at cut brick buffer 57 are processed, one of the conveying grippers or an additional conveying gripper can be executed as a lifting conveying gripper. This refers to a transport and holding device like 12 or 49 but with the additional function of lifting the gripped brick above the bricks lying on line-up belt 5. This permits a later cut brick to be inserted on line-up belt 5 further downstream.

FIG. 15 shows how it is possible to rearrange bricks so as to cut bricks 9a, 9b out of whole brick 9 shown on the left for minimizing waste 9c.

For this purpose, cut brick 9b that is supplied to line-up path 5 in a different order than for masoning is lifted above the bricks located downstream, i.e. whole brick 9 and cut brick 9a, and set down on line-up path 5 before being gripped with transfer gripper 30 for masoning at bricklaying station 7a. As long as cut brick 9b is in buffer 57, the further transport and holding device working on line-up path 5 can lift brick 9b above other bricks 9, 9a and set it down on line-up path 5 in the right position for bricklaying station 7a.

This is essential in particular for tongue and groove bricks. If there is opening 70 in the wall, cut edge 71 of a cut brick cannot face wall opening 70, but only the shell. This results in the necessity of resorting.

What is claimed is:

1. A method for producing wall panels containing bricks that are partly cut at a cutting station and conveyed to a line-up path, comprising the steps of: gripping the bricks to be cut with a transport and holding device; conveying the bricks along a conveying path and into at least one cutting station having a cutting device using the transport and holding device; and swiveling the cutting device relative to the conveyed bricks and cutting the bricks in a clamped state in one of a plurality of different cutting planes.

2. The method according to claim 1, including the steps of:
   storing bricks that are cut in a buffer downstream of the at least one cutting station; and
   adding the cut bricks to un-cut bricks on the line-up path, which follows the conveying path and the buffer.

3. The method according to claim 2, including taking cut bricks that are required in a different order for masoning from the buffer using the transport and holding device or a second transport and holding device and lifting the cut bricks above the un-cut bricks located downstream, and setting the cut bricks on the line-up path.

4. The method according to claim 1, including supplying no-cut bricks to the line-up path downstream of the cutting station; and masoning the bricks into wall panels.

5. The method according to claim 1, including measuring the brick size; determining an average brick size on the basis of measured brick dimensions; and cutting selected ones of the bricks on the basis of the average brick size.

6. The method according to claim 5, including lining the bricks up in the line-up path; and pulling apart the bricks to correct for differences of average and measured brick sizes.

7. The method according to claim 5, including depiling bricks from brick piles using a depiling gripper, the measurement of brick sizes being performed during at least one of depiling and conveying.

8. The method according to claim 6, wherein the step of pulling apart of the bricks is performed during their transport to the line-up path.

9. The method of claim 1, wherein the different cutting planes include inclined planes relative to a surface along a length of the uncut bricks.

10. An apparatus comprising:
    a transport and holding device for supplying bricks; at least one cutting station for cutting the bricks; a line-up path for receiving cut bricks and uncut bricks, wherein the transport and holding device is provided with clamping jaws for clamping bricks to be cut and is adapted to be moved along a conveying path through the at least one cutting station during cutting.

11. The apparatus according to claim 10, wherein the at least one cutting station is capable of cutting bricks in a plurality of cutting planes.

12. The apparatus according to claim 10, wherein one of the cutting stations includes a horizontal saw with a saw blade in a horizontal plane.

13. The apparatus according to claim 11, wherein a second one of the cutting station includes a crosscut saw with a saw blade in a vertical plane, the saw blade capable of being swiveled about a vertical axis.

14. The apparatus according to claim 10, wherein the conveying path is preceded by a buffer for bricks to be cut.

15. The apparatus according to claim 10, comprising a transfer robot for transporting bricks lined up on the line-up path to a bricklaying station for masoning a wall panel, and a cylinder for applying mortar or other binder to an underside of a brick row held, by the transfer robot during transport from the line-up path to the bricklaying station.

16. The apparatus according to claim 15, wherein two cutting lines each with a said lineup path are provided, the two line-up paths being disposed on opposing sides of the bricklaying station.

17. The apparatus according to claim 10, including an automatic crane for inserting piles of bricks into a magazine, the crane being controlled by a control device.

18. An apparatus comprising: a transport and holding device for supplying bricks; and at least one cutting station for cutting the bricks; and a line-up path for receiving cut bricks and uncut bricks, wherein the transport and holding device is provided with clamping jaws for clamping bricks to be cut at the at least one cutting station, the cutting station including a tilting device for tilting bricks.

19. The apparatus according to claim 18, wherein a second one of said transport and holding devices is provided for picking up bricks from a buffer and setting the bricks on the line-up path, and the tilting device comprises a tilt table.

20. The apparatus according to claim 19, wherein at least one of the first and second transport and holding devices is adapted to be lifted by at least one brick height for lifting a picked up brick above bricks lying on the line-up path or the conveying path.

21. An apparatus comprising at least one transport and holding device for supplying bricks, the at least one transport and holding device including at least one slideway on each side of a conveying path on which at least one conveying gripper is movably guided, each said gripper being provided with a clamping jaw pair; a cutting station for cutting the bricks, and a line-up path for receiving cut bricks and no-cut bricks.

22. The apparatus according to claim 21, comprising a first and a second one of said conveying grippers, said first and second grippers being capable of overtaking each other along the slideway.

23. The apparatus according to claim 21, wherein the slideways are adjustable to adapt to brick width.

24. The apparatus according to claim 21, wherein the clamping jaw pairs are guided on the conveying gripper so as to be vertically displaceable by at least one brick height.

25. An apparatus comprising:

a transport and holding device for supplying bricks, the transport and holding device including at least one slideway on each side of a conveying path and including clamping jaws for clamping bricks to be cut;

a cutting station for cutting the bricks traveling along the conveying path, the cutting station comprising a universal cutting saw that is rotatable about a vertical axis and movable upwardly and downwardly along the vertical axis for cutting bricks in different vertically oriented cutting planes, said saw being rotatable about a swivel axis transverse to the vertical axis;

a buffer path for receiving cut bricks; and a line-up path for receiving cut bricks and uncut bricks.

26. The apparatus according to claim 25, the apparatus including a size detecting device for detecting the size of each brick being transferred to the line-up row, and wherein the cutting planes include inclined planes with respect to a surface along a length of the uncut bricks.

* * * * *